(No Model.)

J. W. PARKIN.
INSULATED JOINT FOR GAS FIXTURES.

No. 595,338. Patented Dec. 14, 1897.

WITNESSES
P. H. Eagle.
L. Douville.

INVENTOR.
Joseph W. Parkin.
BY Hua Diederheim
ATTORNEY

UNITED STATES PATENT OFFICE.

JOSEPH W. PARKIN, OF PHILADELPHIA, PENNSYLVANIA.

INSULATED JOINT FOR GAS-FIXTURES.

SPECIFICATION forming part of Letters Patent No. 595,338, dated December 14, 1897.

Application filed January 11, 1897. Serial No. 618,717. (No model.)

*To all whom it may concern:*

Be it known that I, JOSEPH W. PARKIN, a citizen of the United States, residing in the city and county of Philadelphia, State of Pennsylvania, have invented a new and useful Improvement in Insulated Joints for Gas-Fixtures, which improvement is fully set forth in the following specification and accompanying drawings.

My invention consists of an improved construction of joint applicable to a gas-fixture which is electrically lighted and has the wire or conductor passed around or running through the fixture, it being important to insulate the joint formed by the couplings of the gas-pipe in order to prevent grounding and burning through of the coupling, whereby the gas is ignited, which is frequently the cause of fires.

It further consists of novel details of construction, all as will be hereinafter set forth, and specifically pointed out in the claims.

Figure 1:
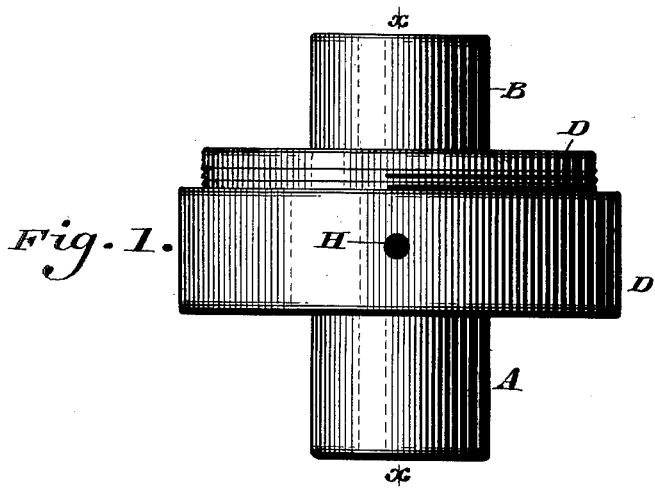
Figure 2:
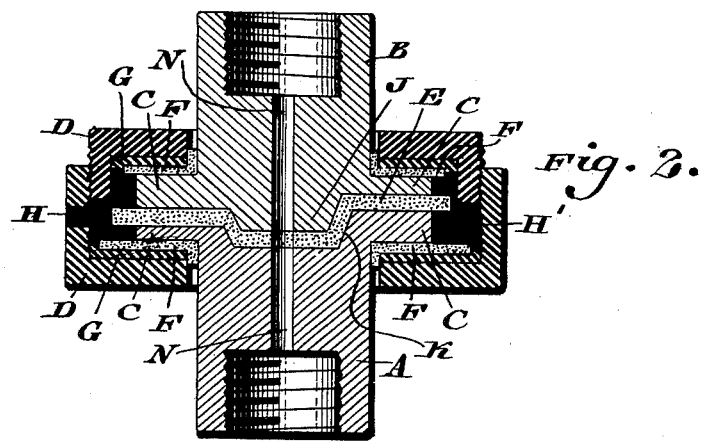
Figure 3:
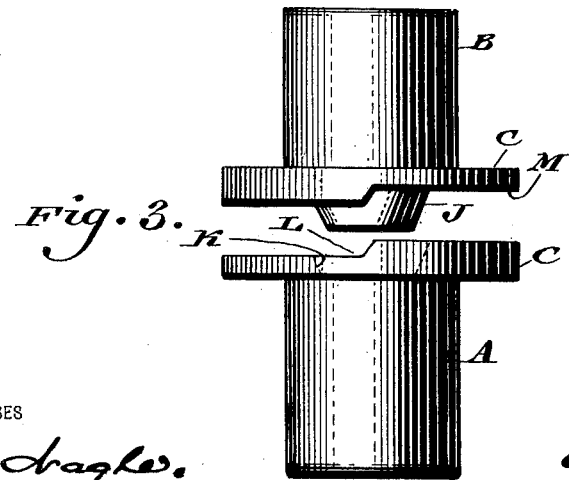

Figure 1 represents a side elevation of an insulated joint for gas-fixtures embodying my invention, the parts being shown in assembled position. Fig. 2 represents a vertical section on line *x x*, Fig. 1. Fig. 3 represents a side elevation of the couplings, showing the same in a separated position and certain parts removed.

Similar letters of reference indicate corresponding parts in the several figures.

Referring to the drawings, A and B designate members of a coupling, which are provided with flanges C, which are clamped together by the two-part sleeve D or other equivalent device, the preferred manner of securing said sleeves being understood from Fig. 2, in which one sleeve fits within the other, the outer face of one being screw-threaded and engaging the screw-threads on the inner face of the other, whereby a tight and solid joint between the members is made, an equal bearing on all the parts is assured, and access to the interior cannot be had while the sleeves are in position, it being further noticed that the sleeves will be held in position without the use of bolts and nuts.

Between the flanges C is placed a disk or plate of mica E or other suitable insulation.

F designates insulating-rings of mica or other suitable material, which are placed on the outer sides of the flanges C, said insulation having adjacent thereto the washers G, of iron or other suitable material, said washers being interposed between the inner sides of the coupling-sleeves D and the mica F and the function of said washers being to protect the mica F.

H designates an opening in one of the sleeves D, into which cement may be poured, thus sealing the parts with which said cement comes in contact, said cement being indicated by the dark ring H' in Fig. 2 and occupying the space between the flanges C and the couplings B.

In the preferred form of my invention I provide the flanges C with recesses or offsets L and M, which are located oppositely to each other, as indicated in Fig. 3, and assist in locking the parts when in assembled position, while the coupling B is provided with a nose J, which enters a suitable recess K in the coupling A when the parts are assembled, whereby the openings N in each of said members are in alinement when the parts are assembled.

It will be evident from the foregoing that a tight and reliable insulating-joint is thus provided for a gas-fixture electrically lighted, since the parts can be drawn together and adjusted as desired, and if anything is out of order the parts can be separated and repairs can be made.

It will of course be evident that various changes may be made by those skilled in the art which will come within the scope of my invention, and I do not, therefore, desire to be restricted to the exact construction I have herein shown and described.

Having thus described my invention, what I claim as new, and desire to secure by Letters Patent, is—

1. In a joint for gas-fixtures, a plurality of members, peripheral flanges on adjacent ends of said members, an insulating-plate between said ends and flanges, insulating-rings on the outer sides of said flanges and sectional sleeves one of which is adapted to fit within the other, whereby the same are held in position.

2. In a joint for gas-fixtures, a plurality of members having flanges attached thereto, insulation intermediate said members, sectional clamping devices which are adapted to fit each other telescopically, whereby the same are held in position, insulating-rings and washers intermediate said flanges and clamping devices, and means for cementing the interior of said clamping devices.

3. In a joint for gas-fixtures, a plurality of members, the same being provided with flanges, sleeves for holding said members in juxtaposition, one of said sleeves fitting within the other, whereby the same are held in position, an insulating-ring intermediate said flanges, insulating-rings adjacent said flanges, metal rings intermediate said sleeves and rings, and offsets located oppositely to each other and forming locking devices.

4. In a joint for gas-fixtures, a plurality of members, one of which is provided with the nose J and the other with the recess K, flanges C on said members having locking devices thereon, the insulating-plate E between said flanges, the insulating-rings F adjacent said flanges, the rings G of metal or other suitable material adjacent said insulating-rings, sleeves D, one of which is adapted to enter the other, said sleeves holding said members in position and means located in the space intermediate said sleeves and flanges for sealing the parts.

JOSEPH W. PARKIN.

Witnesses:
JOHN A. WIEDERSHEIM,
WM. C. WIEDERSHEIM.